United States Patent
Kuratani et al.

(10) Patent No.: US 12,294,113 B2
(45) Date of Patent: May 6, 2025

(54) SEPARATOR FOR NON-AQUEOUS SECONDARY BATTERY AND NON-AQUEOUS SECONDARY BATTERY

(71) Applicant: Teijin Limited, Osaka (JP)

(72) Inventors: Rika Kuratani, Osaka (JP); Megumi Sato, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 865 days.

(21) Appl. No.: 16/767,310

(22) PCT Filed: Nov. 29, 2018

(86) PCT No.: PCT/JP2018/044096
§ 371 (c)(1),
(2) Date: May 27, 2020

(87) PCT Pub. No.: WO2019/107521
PCT Pub. Date: Jun. 6, 2019

(65) Prior Publication Data
US 2020/0411827 A1    Dec. 31, 2020

(30) Foreign Application Priority Data

Nov. 30, 2017 (JP) ................. 2017-231255

(51) Int. Cl.
*H01M 50/46* (2021.01)
*H01M 50/417* (2021.01)
*H01M 50/426* (2021.01)
*H01M 50/443* (2021.01)
*H01M 50/451* (2021.01)
*H01M 50/457* (2021.01)

(52) U.S. Cl.
CPC ....... *H01M 50/461* (2021.01); *H01M 50/417* (2021.01); *H01M 50/426* (2021.01); *H01M 50/443* (2021.01); *H01M 50/451* (2021.01); *H01M 50/457* (2021.01)

(58) Field of Classification Search
CPC .......... H01M 50/411; H01M 50/461
See application file for complete search history.

(56) References Cited

U.S. PATENT DOCUMENTS

| | | | |
|---|---|---|---|
| 2014/0030578 A1 | 1/2014 | Hoshiba et al. | |
| 2014/0308567 A1* | 10/2014 | Nishikawa | H01M 50/491 429/144 |
| 2017/0338460 A1 | 11/2017 | Kim et al. | |

FOREIGN PATENT DOCUMENTS

| | | | | |
|---|---|---|---|---|
| JP | 07-309965 A | | 11/1995 | |
| JP | 2001118558 A | * | 4/2001 | |
| JP | 2001-307735 A | | 11/2001 | |
| JP | 2003178804 A | * | 6/2003 | |
| JP | 4127989 B2 | | 7/2008 | |
| JP | 2014-041818 A | | 3/2014 | |
| JP | 2017-208338 A | | 11/2017 | |
| KR | 1480499 B1 | * | 1/2015 | |
| WO | 2013/058371 A1 | | 4/2013 | |
| WO | 2014/021290 A1 | | 2/2014 | |
| WO | 2014/021293 A1 | | 2/2014 | |
| WO | WO-2017082258 A1 | * | 5/2017 | .......... H01M 10/052 |
| WO | WO-2017082261 A1 | * | 5/2017 | ............ C09J 127/16 |

OTHER PUBLICATIONS

Japanese Office Action Issued in JP 2019-513871 dated May 28, 2019.
International Search Report for PCT/JP2018/044096 dated Jan. 8, 2019 (PCT/ISA/210).

* cited by examiner

*Primary Examiner* — Stephan J Essex
(74) *Attorney, Agent, or Firm* — Sughrue Mion, PLLC

(57) ABSTRACT

An embodiment according to the invention provides a separator for a non-aqueous secondary battery, containing a porous substrate and an adhesive porous layer that contains resin A and resin B1; (1) resin A: a copolymer containing vinylidene fluoride (VDF) and hexafluoropropylene (HFP), in which a molar content of HFP monomer unit with respect to a total molar quantity of VDF monomer unit and HFP monomer unit is from more than 1.5 mol % to 3.5 mol %, and (2) resin B1: a copolymer containing VDF, HFP, and a monomer of formula (1), in which a molar content of HFP monomer unit with respect to a total molar quantity of VDF monomer unit, HFP monomer unit, and a monomer unit of formula (1) is from more than 3.5 mol % to 15 mol % ($R^1$ to $R^3$: H, a halogen atom, a carboxyl group, etc., or a $C_{1-5}$ alkyl group; X: a single bond, a $C_{1-5}$ alkylene group, etc., Y: H, a $C_{1-5}$ alkyl group, etc.):

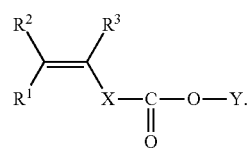

(1)

9 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2018/044096 filed Nov. 29, 2018, claiming priority based on Japanese Patent Application No. 2017-231255 filed Nov. 30, 2017, the disclosure of which is incorporated herein in its entirety by reference.

TECHNICAL FIELD

The present disclosure relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. Outer package of non-aqueous secondary batteries has been lightened with size reduction and weight reduction of portable electronic devices. As outer packaging materials, aluminum cans have been developed in place of stainless cans, and further, aluminum laminated film packages have been developed in place of metallic cans.

An aluminum laminated film package has a characteristics of being soft, and therefore in a battery having the package as an outer packaging material (a so called soft package battery), a gap is easily formed between an electrode and a separator due to the influence of the external impact, or electrode expansion and shrinkage associated with charge-discharge, so that the cycle life of the battery may be reduced.

In view of the above circumference, recently, a technique to increase adhesion between an electrode and a separator has been suggested. As one of the techniques to enhance the adhesiveness between an electrode and a separator, a separator having an adhesive porous layer containing a polyvinylidene fluoride type resin on a polyolefin microporous film is known (for example, Japanese patent No. 4127989, WO 2014/021293, WO 2013/058371, WO 2014/021290 and Japanese Patent Application Laid-Open (JP-A) No. 2014-41818). When this separator is superimposed and thermally pressed on an electrode with an electrolyte solution included therein (so-called "wet heat press"), the separator is well adhered to the electrode through the adhesive porous layer, thereby improving the cycle life of a soft package battery.

SUMMARY OF INVENTION

Technical Problem

However, non-aqueous secondary batteries having increased energy density have recently tended to make the battery area larger so as to be applicable to power storage or electrically driven vehicle use, and a further increase in adhesion between the electrode and the separator described above has been sought. Specifically, when the area of a soft package battery is enlarged, the adhesion between the battery and the separator is likely to decrease. Thus, the adhesion is critical from the viewpoints of securing battery capacity, maintaining charge-discharge characteristics, and preventing occurrence of battery swelling, etc.

In addition, the non-aqueous secondary batteries should be made to have much higher capacity and energy density. From such viewpoints, water-based binder-using negative electrodes have been prevailed, and it is desirable to further increase adhesion between the water-based binder-containing negative electrode and a polyvinylidene fluoride type resin-containing adhesive porous layer.

Meanwhile, examples of a method of manufacturing a battery using a separator having an adhesive porous layer containing a polyvinylidene fluoride type resin include: a method of housing a layered body including electrodes and a separator in an exterior material while the layered body in a wet state in an electrolytic solution is heat pressed (hereinafter, also referred to as "wet heat press"); and a method of housing a layered body including electrodes and a separator in an exterior material while, without soaking in an electrolytic solution, heat pressed (hereinafter, also referred to as "dry heat press").

In the case of wet heat press, a polyvinylidene fluoride type resin in a swelling state in the electrolytic solution is heat pressed. Accordingly, adhesion between the electrode(s) and the separator is favorable and superior battery characteristics are thus readily obtained. Unfortunately, depending on the temperature at the time of wet heat press, the electrolytic solution and an electrolyte may be decomposed to generate gas in the battery and as a result of which the battery may be swelled. For instance, in jelly roll batteries, this phenomenon is likely to occur. Thus, regarding the temperature and the duration at the time of wet heat press, permissible conditions are desirably broad. If the conditions required for wet heat press are less restricted, good-quality batteries can be likely to be stably manufactured using various manufacturing processes.

Meanwhile, when the adhesion between the electrode(s) and the separator after dry heat press is favorable, wet heat press is unnecessary. Accordingly, there is no occurrence of the electrolytic solution and electrolyte decomposition, which has been a problem in the case of wet heat press. In addition, even in the case of wet heat press, the layered body may be beforehand subjected to dry heat press to bond the electrode(s) and the separator. This makes it possible to lower the temperature during wet heat press. As a result, the electrolytic solution and electrolyte decomposition can be suppressed. Further, if dry heat press is carried out, before the layered body is housed in the exterior material, to bond the electrode(s) and the separator, the layered body may be less deformed during transfer when housed in the exterior material.

Collectively, if favorable adhesion can be secured by any of wet heat press or dry heat press at the time of bonding an electrode(s) and a separator, batteries should be manufactured highly efficiently and stably when the batteries are made to have a larger area. The present disclosure has been made in view of such a situation.

An embodiment of the invention addresses the problem of providing a separator for a non-aqueous secondary battery such that adhesion to an electrode(s) by any of wet heat press or dry heat press is excellent and the temperature and time conditions required at the time of, in particular, wet heat press are less restricted, so that the separator is applicable to various battery manufacturing processes.

Another embodiment of the invention addresses the problem of providing a non-aqueous secondary battery having increased productivity.

Solution to Problem

The specific solutions to the problem include the following embodiments.

<1> A separator for a non-aqueous secondary battery, the separator including:
  a porous substrate; and
  an adhesive porous layer that is provided on one side or both sides of the porous substrate and contains the following resin A and resin B1:
  (1) resin A: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 1.5 mol % to 3.5 mol %, and
  (2) resin B1: a polyvinylidene fluoride type resin that is a copolymer containing, as monomer components, vinylidene fluoride, hexafluoropropylene, and a monomer represented by the following formula (1), wherein a molar content of a hexafluoropropylene monomer unit with respect to a total molar quantity of a vinylidene fluoride monomer unit, the hexafluoropropylene monomer unit, and a monomer unit represented by the following formula (1) is from more than 3.5 mol % to 15 mol %.

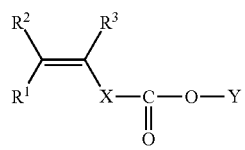

(1)

In Formula (1), each of $R^1$, $R^2$, and $R^3$ independently represents a hydrogen atom, a halogen atom, a carboxyl group or a derivative thereof, or a $C_{1-5}$ alkyl group; X represents a single bond, a $C_{1-5}$ alkylene group, or a substituted $C_{1-5}$ alkylene group; and Y represents a hydrogen atom, a $C_{1-5}$ alkyl group, or a $C_{1-5}$ alkyl group that contains at least one hydroxy group.

<2> The separator for a non-aqueous secondary battery according to <1>, wherein a content amount of the monomer represented by the formula (1) in the resin B1 with respect to a total molar quantity of the monomer components included in the resin B1 is 0.1 mol % or higher.

<3> A separator for a non-aqueous secondary battery, the separator including:
  a porous substrate; and
  an adhesive porous layer that is provided on one side or both sides of the porous substrate and contains the following resin A and resin B2, wherein a total acid value of the resin A and the resin B2 is from 3.0 mg KOH/g to 20 mg KOH/g:
  (1) resin A: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 1.5 mol % to 3.5 mol %, and
  (2) resin B2: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 3.5 mol % to 15 mol %.

<4> The separator for a non-aqueous secondary battery according to any one of <1> to <3>, wherein the adhesive porous layer further contains an inorganic filler, and an average particle diameter of the inorganic filler is from 0.1 μm to 0.7 μm.

<5> The separator for a non-aqueous secondary battery according to <4>, wherein the inorganic filler is a magnesium-based filler.

<6> The separator for a non-aqueous secondary battery according to any one of <1> to <5>, wherein a total amount of the resin A and the resin B1 or a total amount of the resin A and the resin B2 in the adhesive porous layer is from 0.6 g/m² to 4.0 g/m².

<7> The separator for a non-aqueous secondary battery according to any one of <1> to <6>, wherein a porosity of the adhesive porous layer is from 40% to 70%.

<8> The separator for a non-aqueous secondary battery according to any one of <1> to <7>, wherein the resin A further contains, as a monomer component, a monomer represented by the following formula (1).

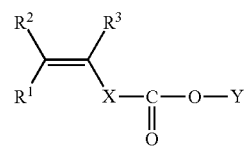

(1)

In Formula (1), each of $R^1$, $R^2$, and $R^3$ independently represents a hydrogen atom, a halogen atom, a carboxyl group or a derivative thereof, or a $C_{1-5}$ alkyl group; X represents a single bond, a $C_{1-5}$ alkylene group, or a substituted $C_{1-5}$ alkylene group; and Y represents a hydrogen atom, a $C_{1-5}$ alkyl group, or a $C_{1-5}$ alkyl group that contains at least one hydroxy group.

<9> The separator for a non-aqueous secondary battery according to <8>, wherein a content amount of the monomer represented by the formula (1) in the resin A is 0.1 mol % or higher.

<10> The separator for a non-aqueous secondary battery according to any one of <1> to <9>, wherein a weight-average molecular weight of the resin A is from 700,000 to 3,000,000.

<11> The separator for a non-aqueous secondary battery according to any one of <1> to <10>, wherein a weight-average molecular weight of the resin B1 or the resin B2 is from 100,000 to less than 700,000.

<12> The separator for a non-aqueous secondary battery according to any one of <1> to <11>, wherein a content amount (A:B1) between the resin A and the resin B1 or a content amount between the resin A and the resin B2 (A:B2) in the adhesive porous layer is from 15:85 to 85:15 in a mass basis.

<13> The separator for a non-aqueous secondary battery according to any one of <1> to <12>, wherein a molecular weight distribution (Mw/Mn), which is a ratio of a weight-average molecular weight (Mw) to a number-average molecular weight (Mn), of an entirety of the resin A and the resin B1 or an entirety of the resin A and the resin B2 is more than 2.0.

<14> A non-aqueous secondary battery that obtains electromotive force by lithium doping and dedoping, the non-aqueous secondary battery including:
a positive electrode;
a negative electrode; and
the separator for a non-aqueous secondary battery according to any one of <1> to <13>, the separator being disposed between the positive electrode and the negative electrode.

Advantageous Effects of Invention

According to an embodiment of the invention, it is provided a separator for a non-aqueous secondary battery such that adhesion to an electrode(s) by any of wet heat press or dry heat press is excellent and the temperature and time conditions required at the time of, in particular, wet heat press are less restricted, so that the separator is applicable to various battery manufacturing processes.

According to another embodiment of the invention, it is provided a non-aqueous secondary battery having increased productivity.

DESCRIPTION OF EMBODIMENTS

Hereinafter, a separator for a non-aqueous secondary battery and a non-aqueous secondary battery according to the disclosure will be described.

In the present application, the numerical range denoted by using "to" represents the range inclusive of the number written before and after "to" as the lower limit and upper limit values. Regarding stepwise numerical ranges designated in the present disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the present application, in a case where plural kinds of substances that correspond to the same component exist in a composition, the amount of the component in the composition refers to the total amount of the plural kinds of substances existing in the composition unless otherwise specified.

In the present application, the term "process" includes not only an independent process, but also the process which is not clearly distinguished from other processes but achieves the desired purpose thereof.

As used herein, the "monomer component" of resin A, resin B1 and resin B2 refers to a copolymeric component that constitutes the resin of copolymer and means a constitutional unit when a monomer is subjected to a copolymerization reaction.

Hereinafter, a monomer component of vinylidene fluoride is sometimes referred to as "VDF", and a monomer component of hexafluoropropylene is sometimes referred to as "HFP". Further, thermocompression bonding is sometimes referred to as "thermal press".

<Separator for Non-Aqueous Secondary Battery>

A separator for a non-aqueous secondary battery according to the disclosure (hereinafter, also simply referred to as a "separator") is provided with a porous substrate and an adhesive porous layer and may be configured by any of the following first or second embodiment (hereinafter, the both including and sometimes referred to as a "separator for a non-aqueous secondary battery according to the disclosure" or "separator of the disclosure").

Note that "resin A" in the first or second embodiment has the same meaning. The same applies to preferable embodiments. In addition, as used herein, "resin B1" in the first embodiment and "resin B2" in the second embodiment are sometimes generally referred to as "resin B".

A separator for a non-aqueous secondary battery according to the first embodiment of the disclosure includes:
a porous substrate; and
an adhesive porous layer that is provided on one side or both sides of the porous substrate and contains the following resin A and resin B1:
(1) resin A: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 1.5 mol % to 3.5 mol %, and
(2) resin B1: a polyvinylidene fluoride type resin that is a copolymer containing, as monomer components, vinylidene fluoride, hexafluoropropylene, and a monomer represented by the following formula (1), wherein a molar content of a hexafluoropropylene monomer unit with respect to a total molar quantity of a vinylidene fluoride monomer unit, the hexafluoropropylene monomer unit, and a monomer unit represented by the following formula (1) is from more than 3.5 mol % to 15 mol %:

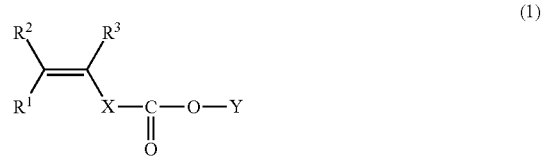

wherein, in Formula (1), each of $R^1$, $R^2$, and $R^3$ independently represents a hydrogen atom, a halogen atom, a carboxyl group or a derivative thereof, or a $C_{1-5}$ alkyl group; X represents a single bond, a $C_{1-5}$ alkylene group, or a substituted $C_{1-5}$ alkylene group; and Y represents a hydrogen atom, a $C_{1-5}$ alkyl group, or a $C_{1-5}$ alkyl group that contains at least one hydroxy group.

A separator for a non-aqueous secondary battery according to the second embodiment of the disclosure includes:
a porous substrate; and
an adhesive porous layer that is provided on one side or both sides of the porous substrate and contains the following resin A and resin B2, wherein a total acid value of the resin A and the resin B2 is from 3.0 mg KOH/g to 20 mg KOH/g:
(1) resin A: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 1.5 mol % to 3.5 mol %, and (2) resin B2: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 3.5 mol % to 15 mol %.

The separator for a non-aqueous secondary battery according to the disclosure has excellent adhesion to an electrode(s) by any of a wet heat press or dry heat press process because of inclusion of an adhesive porous layer containing two specific kinds of polyvinylidene fluoride (PVDF) type resin. In the case of wet heat press, in particular, the temperature and time conditions required for bonding are less restricted. Even in the case of bonding under broad press conditions such as in the case of bonding in a low-temperature range or long-term bonding, for instance, the adhesion to an electrode(s) (hereinafter, also referred to as "wet adhesion") is excellent.

The reasons why the separator of the disclosure can exert the effects are guessed as follows. Specifically, PVDF type resins are typically highly crystalline and are thus weakly bonded to an electrode. Meanwhile, water-based binder-using negative electrodes have been prevailed. Accordingly, to secure sufficient adhesion to the electrodes, resin crystallinity may be lowered.

Regarding this point, when the ratio of a copolymerization component such as hexafluoropropylene (HFP) other than vinylidene fluoride in the PVDF type resin is relatively low (in the case of 3.5 mol % or less), swelling in an electrolytic solution tends to be insufficient. Accordingly, while adhesion by wet heat press is retained, it tends to be difficult to increase adhesion by dry heat press. By contrast, PVDF type resin crystallinity is disintegrated more as the ratio of a copolymerization component such as HFP increases. Thus, fluidity during heating becomes higher and swelling in an electrolytic solution also becomes higher. Hence, selection of a copolymer having more than a specific percentage (3.5 mol %) of a copolymerization component copolymerized with vinylidene fluoride enables conditions required for adhesion to an electrode to be less restricted. A separator of the disclosure contains resins with different copolymerization components so as to improve adhesion, thereby making it easy to obtain favorable adhesion to an electrode even under mild press conditions in the case of, in particular, wet heat press. This effectively improves application of the separator of the disclosure to various manufacturing processes.

Note that when the PVDF type resin crystallinity is too low, the swelling in an electrolytic solution is too high. As a result, after an electrode(s) and the separator are bonded by dry heat press, soaking in the electrolytic solution causes the bonding to be easily weakened. On top of that, pores are easily occluded. This tends to result in not only insufficient adhesion, but also inhibited ionic migration, in particular, deteriorated long-term cycle characteristics and load characteristics. Thus, it is important that the ratio of the copolymerization component(s), other than vinylidene fluoride, included in the copolymer is a specific percentage or less.

In addition, a separator of the disclosure may contain a monomer represented by formula (1) as a monomer component in a resin included in its adhesive porous layer or the acid value of a resin included in its adhesive porous layer is within a specific range. In this case, a copolymer PVDF type resin, namely an acidic group or a constitutional unit derived from the monomer represented by formula (1) interacts with an electrode active substance to enhance adhesion between the adhesive porous layer and an electrode (i.e., adhesion by any of wet heat press or dry heat press) and to extend press conditions required in the case of, in particular, wet heat press. This makes it easier to secure adhesion between the adhesive porous layer and an electrode when the separator of the disclosure is manufactured by various manufacturing processes.

To enhance the adhesion between the electrode(s) and the separator, it is critical to increase affinity of the separator to an electrode material. A separator of the disclosure has favorable adhesion to an electrode(s) by any of wet heat press or dry heat press, thereby eliciting favorable ion permeability after the heat press. In the case of wet heat press, in particular, it is possible to retain favorable adhesion even under mild temperature and long-time conditions, so that the favorable adhesion is expressed in various manufacturing processes under broad press conditions.

This may result in an effective increase in battery characteristics such as long-term cycle characteristics.

In addition, a separator of the disclosure excels in wet adhesion not only to an electrode(s) using a solvent-based binder (specifically, a PVDF type resin) but also to an electrode(s) using an aqueous binder (specifically, a styrene-butadiene copolymer).

A separator of the disclosure excels in adhesion to an electrode(s), so that a non-aqueous secondary battery using the separator of the disclosure has excellent cell strength. In addition, a separator of the disclosure may be subject to wet heat press treatment under broad press conditions and may be hot pressed under mild conditions, and excels in adhesion to an electrode(s) after the hot press. Thus, the favorable porous structure can be maintained after the hot press and during long-term cycle testing. As a result, a non-aqueous secondary battery using the separator of the disclosure excels in electrode characteristics such as cycle characteristics and load characteristics.

Further, an appropriate temperature can be selected from broad press conditions at the time of wet heat press, so that optimal press conditions can be selected depending on the kinds of an electrolytic solution and an electrolyte. Consequently, gas generation caused by decomposition of the electrolytic solution and the electrolyte is suppressed and as a result of which a problem of battery gas swelling hardly occurs.

Furthermore, in a separator of the disclosure, electrode expansion and shrinkage accompanied by charge and discharge as well as a phenomenon of formation of a gap between an electrode and a separator, which gap is likely to be caused by an external impact, can be suppressed. Hence, the separator of the disclosure fits for soft package batteries using an aluminum laminated film-made package as an exterior material and contributes to an increase in battery performance after the soft pack batteries are manufactured.

Moreover, as described previously, the bonding under mild temperature and time conditions is allowed, so that in cylindrical batteries and square batteries, it is possible to secure, after an aging process, the bonding between the separator and an electrode(s) upon pressure (external pressure) given from the outside when housed in an exterior material.

First, an acid value in the second embodiment will be described.

The acid value of PVDF type resins (resin A and resin B2) included in an adhesive porous layer in the second embodiment ranges from 3.0 mg KOH/g to 20 mg KOH/g.

That the acid value of PVDF type resin included in an adhesive porous layer ranges from 3.0 mg KOH/g to 20 mg KOH/g means that a certain level or more of acidic group (preferably a carboxyl group) is included in the PVDF type resin. Then, the acidic group (preferably a carboxyl group) may interact with an electrode active substance to increase adhesion between the adhesive porous layer and an electrode. That is, even if soaked in an electrolytic solution after dry heat press, the separator and an electrode(s) can easily be kept bonded. In addition, it is considered that another wet heat press may be carried out after the soaking in an electrolytic solution to restore the adhesion between the separator and the electrode(s). From such a viewpoint, the acid value of PVDF type resin is more preferably 5.0 mg KOH/g or higher and still more preferably 7.0 mg KOH/g or higher. Further, the higher the acid value of PVDF type resin, the better from the viewpoint of adhesion of the adhesive porous layer to an electrode. However, from the viewpoint of oxidation resistance of the separator and an electrode, the acid value of the PVDF type resin is more preferably 15 mg KOH/g or lower.

The acid value refers to a value calculated by potentiometric titration (JIS K1557-5:2007) for the PVDF type resin. Specifically, the acid value can be calculated by extracting PVDF type resin included in the adhesive porous layer and measuring the extracted PVDF type resin by potentiometric titration (JIS K1557-5: 2007).

Next, materials, compositions, physical properties, and others of a separator of the disclosure will be described in detail below.

A separator of the disclosure includes an adhesive porous layer that is provided on one side or both sides of the porous substrate and contains, as polyvinylidene fluoride type resins (PVDF type resin), resin A and resin B1 or B2.

[Adhesive Porous Layer]

An adhesive porous layer in the disclosure contains PVDF type resins: resin A and resin B (resin B1 or B2), preferably contains an inorganic filler, and may optionally further contain another ingredient(s) such as a resin other than the PVDF type resin, an organic filler, and/or an additive.

The adhesive porous layer has plural fine pores therein, has a structure in which these fine pores are connected with each other, and allows gas or liquid to pass from one surface to the other surface.

The adhesive porous layer is a layer that is provided on one side or both sides of the porous substrate as an outermost layer of the separator, and may be adhered to the electrode when superimposing the separator and the electrode, and performing thermal press.

It is preferred that the adhesive porous layer is provided on both surfaces, rather than provided on only one surface of the porous substrate, from the viewpoint of excellent cycle characteristics (capacity retention) of the battery. It is because when the adhesive porous layer is provided on both surfaces of the porous substrate, both surfaces of the separator may be well-adhered to both electrodes through the adhesive porous layer.

(PVDF Type Resin)

—Resin A—

Resin A is a polyvinylidene fluoride type resin that is a copolymer containing, as monomer components, vinylidene fluoride-derived constitutional unit (VDF unit) and a hexafluoropropylene-derived constitutional unit (HFP unit), in which a molar content of a hexafluoropropylene monomer unit with respect to a total molar quantity of a vinylidene fluoride monomer unit and the hexafluoropropylene monomer unit is from more than 1.5 mol % to 3.5 mol %.

Resin A includes any of a copolymer just having a VDF unit and a HFP unit or a copolymer having a VDF unit, a HFP unit, and an additional monomer unit that is a monomer component other than the VDF unit and the HFP unit.

Resin A has the HFP unit in a content of from more than 1.5 mol % to 3.5 mol % with respect to a total of the VDF unit and the HFP unit. When the HFP unit content exceeds 1.5 mol %, the resin A tends to be easily swelled in an electrolytic solution. This is advantageous in adhesion between the adhesive porous layer and an electrode by wet heat press. Meanwhile, because the HFP unit amount is restricted to a small amount of 3.5 mol % or less, the resin A is not easily dissolved in an electrolytic solution and the adhesion by dry heat press is likely to be kept even after electrolytic solution injection.

From substantially the same viewpoint as above, the HFP unit content is preferably 1.8 mol % or higher and more preferably 2.0 mol % or higher. In addition, the HFP unit content is preferably 3.0 mol % or less.

Examples of the monomer that forms an additional monomer unit include: a halogen-containing monomer such as tetrafluoroethylene, trifluoroethylene, chlorotrifluoroethylene, vinyl fluoride, or trichloroethylene; or a carboxyl group-containing monomer copolymerized for an acid value adjustment purpose (e.g., (meth)acrylic acid, (meth)acrylic acid ester, maleic acid, maleic anhydride, maleic acid ester, and any fluorine-substituted compound thereof).

Resin A may contain a monomer unit derived from one or two or more kinds of these monomers.

It is preferable that the halogen-containing monomer units are monomer units primarily including the VDF unit and the HFP unit. Specifically, the total content of the VDF unit and the HFP unit with respect to the total of the halogen-containing monomer units is preferably 80 mol % or higher, more preferably 90 mol % or higher, and still more preferably 100 mol %. The monomer units included in resin A preferably include, other than the monomer included for the acid value adjustment purpose, only the halogen-containing monomer units (preferably just a VDF unit and an HFP unit).

Resin A preferably contains, as a monomer component, a monomer represented by the following formula (1). Inclusion of not only the below-described resin B but also the monomer represented by formula (1) into resin A is suitable for further improving the adhesion to an electrode.

The monomer represented by formula (1) may be copolymerized with resin A to have a monomer unit derived from the monomer represented by formula (1).

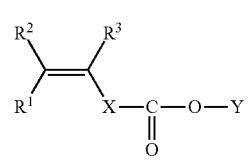

In Formula (1), each of $R^1$, $R^2$, and $R^3$ independently represents a hydrogen atom, a halogen atom, a carboxyl group or a derivative thereof, or a $C_{1-5}$ alkyl group; X represents a single bond, a $C_{1-5}$ alkylene group, or a substituted $C_{1-5}$ alkylene group; and Y represents a hydrogen atom, a $C_{1-5}$ alkyl group, or a $C_{1-5}$ alkyl group that contains at least one hydroxy group.

Examples of the halogen atom in $R^1$, $R^2$, or $R^3$ include a fluorine atom, a chlorine atom, and an iodine atom.

Examples of the $C_{1-5}$ alkyl group in $R^1$, $R^2$, or $R^3$ include a methyl group, an ethyl group, an isopropyl group, and a butyl group. A $C_{1-4}$ alkyl group is preferred.

Examples of the $C_{1-5}$ alkylene group in X include a methylene group and an ethylene group.

Examples of the "substituted $C_{1-5}$ alkylene group" in X include 2-methylethylene and 2-ethylpropylene.

Examples of the $C_{1-5}$ alkyl group in Y include a methyl group, an ethyl group, an isopropyl group, and a butyl group. A $C_{1-4}$ alkyl group is preferred.

Examples of the "a $C_{1-5}$ alkyl group that contains at least one hydroxy group" in Y include 2-hydroxyethyl and 2-hydroxypropyl. A $C_{1-3}$ alkyl group that contains at least one hydroxy group is preferred.

A case is more preferable where among the above, $R^1$, $R^2$, and $R^3$ are a hydrogen atom or a $C_{1-4}$ alkyl group; X is a single bond; Y is a hydrogen atom, a $C_{1-4}$ alkyl group or a $C_{1-3}$ alkyl group that contains at least one hydroxy group.

Examples of monomer represented by Formula (1) include, but are not limited to, an acrylic monomer, an unsaturated dibasic acid, and a monoester monomer of unsaturated dibasic acid.

Examples of the acrylic monomer include methyl acrylate, ethyl acrylate, isopropyl acrylate, n-butyl acrylate, methyl methacrylate, ethyl methacrylate, isopropyl methacrylate, butyl methacrylate, 2-hydroxyethyl acrylate, 2-hydroxyethyl methacrylate, 2-hydroxypropyl acrylate, 2-hydroxypropyl methacrylate, acrylic acid and methacrylic acid. Among them, acrylic acid and methacrylic acid are preferred.

Examples of the unsaturated dibasic acid include unsaturated dicarboxylic acid. More specific examples include (anhydrous) maleic acid, citraconic acid, and itaconic acid.

Examples of the monoester monomer of unsaturated dibasic acid include a maleic acid monomethyl ester, a maleic acid monoethyl ester, a citraconic acid monomethyl ester, a citraconic acid monoethyl ester, an itaconic acid monomethyl ester, and an itaconic acid monoethyl ester. Among them, as the monoester monomer of unsaturated dibasic acid, a maleic acid monomethyl ester and a citraconic acid monomethyl ester are particularly preferred.

Here, when X is a substituted alkylene group, X may contain a hetero atom-containing substituent.

Examples of a monomer having a substituent containing oxygen as a hetero atom include carboxyethyl acrylate and acryloyloxyethyl succinic acid.

It is preferable that the content amount of the monomer, represented by Formula (1), in resin A is 0.1 mol % or more. This causes the resin A to have an acidic group or an ester group in a molecule, thereby improving affinity for electrode material. Then, the resin A included in the adhesive porous layer interacts with an electrode active substance. This results in an increase in adhesion (adhesion by wet heat press or dry heat press) between the adhesive porous layer and the electrode(s), extending pressing conditions needed even in the case of, in particular, wet heat press.

The content amount of the monomer, represented by Formula (1), in resin A is more preferably 0.2 mol % or more, still more preferably 0.5 mol % or more and particularly preferably 1.0 mol % or more. The upper limit of the content amount of the monomer, represented by Formula (1), in resin A is more preferably 10 mol % or less, still more preferably 5.0 mol % or less, and particularly preferably 3.0 mol % or less.

In a case in which resin A has an acidic group, the acid value of the resin A is preferably from 5 mg KOH/g to 20 mg KOH/g and more preferably from 10 mg KOH/g to 15 mg KOH/g.

The acid value can be controlled by introducing, for instance, a carboxy group. The introduction and the introduction amount of the carboxy group into resin A can be controlled by using, as a copolymerization component, a carboxy group-containing monomer represented by the above formula (1) (e.g., (meth)acrylic acid, (meth)acrylic acid ester, maleic acid, maleic anhydride, maleic acid ester, or any fluorine-substituted compound thereof) and then by adjusting a polymerization content.

The acid value assay is as described previously.

It is preferable that a weight-average molecular weight (Mw) of the resin A is from 700,000 to 3,000,000.

In order to achieve favorable cell strength by bonding, mechanical properties of the adhesive porous layer are also important. From such a viewpoint, the Mw is preferably 700,000 or higher. In addition, if the Mw is 3,000,000 or lower, the molding is easy. Accordingly, the Mw is preferable in view of availability.

From substantially the same reason as above, the Mw is more preferably 900,000 or higher and still more preferably 1,000,000 or higher.

Further, the molecular weight distribution (Mw/Mn), which is a ratio of a weight-average molecular weight (Mw) to a number-average molecular weight (Mn), of the resin A is preferably from 2.0 to 5.0 and more preferably from 3.0 to 4.5. If the Mw/Mn is 2.0 or more, it is advantageous in extending the temperature and time conditions required for bonding in the case of wet heat press. In addition, if the Mw/Mn is 5.0 or less, it is advantageous in controlling mechanical properties of the separator after molding.

Each of the weight-average molecular weight (Mw) and the number-average molecular weight (Mn) of the resin A is a value measured by gel permeation chromatography (GPC). Specifically, the molecular weight measurement by GPC is performed by using GPC equipment, "GPC-900" available from JASCO Corporation, two TSKgel SUPER AWM-H's available from TOSOH corporation in the column, and dimethyl formamide as the solvent, under the condition of a temperature of 40° C., and a flow rate of 0.6 mL/min, thereby obtaining a molecular weight in terms of polystyrene.

—Resin B—

(Resin B1)

Resin B1 in the first embodiment is a polyvinylidene fluoride type resin that is a copolymer containing, as monomer components, vinylidene fluoride, hexafluoropropylene, and a monomer represented by the following formula (1), wherein a molar content of a hexafluoropropylene monomer unit with respect to a total molar quantity of a vinylidene fluoride monomer unit, the hexafluoropropylene monomer unit, and a monomer unit represented by the above formula (1) is from more than 3.5 mol % to 15 mol %.

Resin B1 includes any of a copolymer just having the VDF unit, the HFP unit, and the monomer unit represented by formula (1) or a copolymer having the VDF unit, the HFP unit, the monomer unit represented by formula (1), and an additional monomer unit that is a monomer component other than the former units.

The first embodiment includes resin B1. Regardless of the presence or absence of the monomer unit represented by formula (1) and/or the acidic group in resin A, resin B1 having the monomer unit represented by formula (1) is preferably included as resin B.

The total content of the VDF unit and the HFP unit, which are halogen-containing monomer units, with respect to the total content of the halogen-containing monomer units is preferably 80 mol % or higher and more preferably 90 mol % or higher. The monomer units included in the resin B1 preferably include, other than the monomer included for the acid value adjustment purpose, only the halogen-containing monomer units (preferably only a VDF unit and an HFP unit).

Resin B1 has the HFP unit in a content of from more than 3.5 mol % to 15 mol % with respect to the total of the VDF unit, the HFP unit, and the monomer unit represented by formula (1). If the HFP unit content is within a relatively large range of more than 3.5 mol %, polymer chain mobility during heating is high and the resin is readily flowable. Thus, the adhesive porous layer is easily bonded to an electrode by dry heat press. Further, the resin is likely to be swelled in an electrolytic solution, so that the adhesive porous layer is easily bonded to an electrode by wet heat press. From substantially the same viewpoints as above, the HFP unit content is preferably 5.0 mol % or higher and more preferably 6.0 mol % or higher.

In addition, if the HFP unit content is 15 mol % or less, the resin is unlikely to be dissolved in an electrolytic solution. From such a viewpoint, the HFP unit content is more preferably 12 mol % or less and still more preferably 10 mol % or less.

The content amount of the monomer represented by the formula (1) in the resin B1 with respect to the total molar quantity of the monomer components included in the resin B1 is preferably 0.1 mol % or higher. In this way, the resin B1 has an acidic group in a molecule, and the affinity for electrode material is increased more and the resin B1 that forms the adhesive porous layer interacts with an electrode active substance. Thus, this results in an increase in adhesion (adhesion by wet heat press or dry heat press) between the adhesive porous layer and the electrode, extending press conditions needed even in the case of, in particular, wet heat press.

The content amount of the monomer, represented by the Formula (1), in the resin B1 is more preferably 0.2 mol % or higher, still more preferably 0.5 mol % or higher, and particularly preferably 1.0 mol % or higher. The upper limit of the content amount of the monomer, represented by the Formula (1), in the resin B1 is more preferably 10 mol % or less, still more preferably 5.0 mol % or less, and particularly preferably 3.0 mol % or less.

In a case in which the resin B1 has an acidic group, the acid value of the resin B1 is preferably from 5 mg KOH/g to 20 mg KOH/g and more preferably from 10 mg KOH/g to 15 mg KOH/g.

The acid value assay is as described previously.

It is preferable that resin B1 has a weight-average molecular weight (Mw) of from 100,000 to less than 700,000.

To obtain adhesion to an electrode by dry heat press, the adhesive porous layer should be soft and tightly attached to the electrode. Accordingly, if the weight-average molecular weight of resin B1 is 100,000 or higher, the weight-average molecular weight is not too low and dissolution into an electrolytic solution is thus suppressed. In addition, if the weight-average molecular weight is less than 700,000, the adhesive porous layer is soft and has thus excellent adhesion to an electrode.

In particular, the weight-average molecular weight is more preferably from 450,000 to 600,000.

Further, the molecular weight distribution (Mw/Mn), which is a ratio of the weight-average molecular weight (Mw) to the number-average molecular weight (Mn), of resin B1 is preferably from 2.0 to 5.0 and more preferably from 3.0 to 4.5 from substantially the same reason as in the case of resin A.

The weight-average molecular weight (Mw) and the number-average molecular weight (Mn) of resin B1 are values measured by gel permeation chromatography (GPC). The specific protocol is as previously described in the case of resin A.

(Resin B2)

Resin B2 in the second embodiment is a polyvinylidene fluoride type resin that is a copolymer containing, as monomer components, vinylidene fluoride and hexafluoropropylene, wherein the molar content of a hexafluoropropylene monomer unit with respect to the total molar quantity of a vinylidene fluoride monomer unit and the hexafluoropropylene monomer unit is from more than 3.5 mol % to 15 mol %.

Resin B2 includes any of a copolymer only having the VDF unit and the HFP unit or a copolymer having the VDF unit, the HFP unit, and an additional monomer unit that is a monomer component other than the VDF unit and the HFP unit.

Resin B2 has the HFP unit in a content of from more than 3.5 mol % to 15 mol % with respect to the total of the VDF unit and the HFP unit. If the HFP unit content exceeds 3.5 mol %, the resin is likely to be swelled in an electrolytic solution. Thus, it is possible to secure adhesion by wet heat press under lower temperature conditions or lower pressure conditions. Meanwhile, if the HFP unit content is 15 mol % or less, dissolution into an electrolytic solution can be suppressed. Thus, it is possible to keep adhesion even by wet heat press under high temperature conditions or high pressure conditions.

From substantially the same viewpoints as above, the HFP unit content is preferably 4.0 mol % or higher and more preferably 5.0 mol % or higher. In addition, the HFP unit content is preferably 12 mol % or less and more preferably 10 mol % or less.

The second embodiment includes resin B2. If the PVDF type resin has a total acid value, that is, if resin A or the additional resin other than resin A has an acid value, resin B2 free of the monomer unit represented by formula (1) can be used as resin B. Of course, the above-described resin B1 may be used as resin B2.

The total amount of the VDF unit and the HFP unit, which are halogen-containing monomer units, with respect to the total of the halogen-containing monomer units is preferably 80 mol % or higher and more preferably 90 mol % or higher. The monomer units included in resin B2 preferably include, other than the monomer included for the acid value adjustment purpose, only the halogen-containing monomer units (preferably only a VDF unit and an HFP unit).

In a case in which resin B2 has an acidic group, the acid value of the resin B2 is preferably from 1 mg KOH/g to 20 mg KOH/g and more preferably from 2 mg KOH/g to 15 mg KOH/g.

The acid value can be controlled by introducing, for instance, a carboxy group.

The acid value assay is as described previously.

It is preferable that a weight-average molecular weight (Mw) of the resin B2 is from 100,000 to less than 700,000.

To obtain adhesion to an electrode by dry heat press, the adhesive porous layer should be soft and tightly attached to the electrode. Accordingly, if the weight-average molecular weight of resin B2 is 100,000 or higher, the weight-average molecular weight is not too low and dissolution into an electrolytic solution is thus suppressed. In addition, if the weight-average molecular weight is less than 700,000, the adhesive porous layer is soft and has thus excellent adhesion to an electrode.

In particular, the weight-average molecular weight is more preferably from 450,000 to 600,000.

Further, the molecular weight distribution (Mw/Mn), which is a ratio of the weight-average molecular weight (Mw) to the number-average molecular weight (Mn), of resin B2 is preferably from 2.0 to 5.0 and more preferably from 2.5 to 4.0 from substantially the same reason as in the case of resin A.

The weight-average molecular weight (Mw) and the number-average molecular weight (Mn) of resin B2 are values measured by gel permeation chromatography (GPC). The specific protocol is as previously described in the case of resin A.

Further, the molecular weight distribution (Mw/Mn), which is a ratio of the weight-average molecular weight (Mw) to the number-average molecular weight (Mn), of an entirety of the resin B (i.e., resin B1 or resin B2) is preferably from 2.0 to 5.0 and more preferably from 3.0 to 4.5. If the Mw/Mn is 2.0 or more, it is advantageous in extending the temperature and time conditions required for bonding in the case of wet heat press. In addition, if the Mw/Mn is 5.0 or less, it is advantageous in controlling mechanical properties of the separator after molding.

In the adhesive porous layer, one kind of each of resin A or resin B may be included singly, or two or more kinds of resin A and/or resin B may be included.

The total amount of resin A and resin B (i.e., resin B1 or resin B2, or resin B1 and resin B2) in the adhesive porous layer is preferably from 0.6 g/m$^2$ to 4.0 g/m$^2$.

If the total amount of resin A and resin B in the adhesive porous layer is 0.6 g/m$^2$ or more, more favorable adhesion to an electrode can be imparted. In addition, if the total amount of resin A and resin B is 4.0 g/m$^2$ or less, it is advantageous in thinning of the separator.

The total amount of resin A and resin B in the adhesive porous layer is more preferably from 1 g/m$^2$ to 3.5 g/m$^2$ and still more preferably from 1.3 g/m$^2$ to 3.5 g/m$^2$.

The content amount (resin A: resin B) between resin A and resin B (resin B1 or resin B2, or resin B1 and resin B2) in the adhesive porous layer is preferably from 15:85 to 85:15 in a mass basis. If the content amount between resin A and resin B is within the above ranges, the adhesive porous layer has a certain degree of flexibility and can exert mechanical properties durable during heat press. This causes excellent adhesion to an electrode even in the case of any of dry heat press or wet heat press.

The content amount between resin A and resin B is more preferably from 50:50 to 85:15 and still more preferably from 60:40 to 85:15 from substantially the same reason as above.

In the case of a polymer having a narrow molecular weight distribution, namely a polymer having high structural uniformity, the strength of wet bonding to an electrode can be expressed at a specific pressing temperature. However, its uniformity causes an applicable pressing temperature region to be narrow. Accordingly, it is characterized in that when the pressing temperature is deviated, no bonding strength is expressed at all.

From such a viewpoint, the molecular weight distribution (Mw/Mn), which is a ratio of the weight-average molecular weight (Mw) to the number-average molecular weight (Mn), of the entirety of the resin A and the resin B1 or the entirety of the resin A and the resin B2 is preferably in a range of more than 2.0.

The Mw/Mn is more preferably 3.0 or more.

Further, the upper limit of the Mw/Mn is preferably 5.0 or less and more preferably 4.5 or less.

The weight-average molecular weight (Mw) and the number-average molecular weight (Mn) of the entirety of the resin A and the resin B1 or the entirety of the resin A and the resin B2 are values measured by gel permeation chromatography (GPC).

Specifically, for the measurement, a GPC apparatus "GPC-900", manufactured by JASCO Corporation, is used, two TSKgel SUPER AWM-H columns, manufactured by TOSOH corporation, are used, and a solvent dimethylformamide is used. Regarding the measurement conditions, the temperature is 40° C. and the flow rate is 0.6 mL/min, and the molecular weight in terms of polystyrene is calculated.

Meanwhile, in the case of a polymer having a narrow molecular weight distribution, namely a polymer having high structural uniformity, the strength of wet bonding to an electrode can be expressed at a specific pressing temperature. However, its uniformity causes an applicable pressing temperature region to be narrow. Accordingly, it is characterized in that when the pressing temperature is different, no bonding strength is expressed at all.

Resin A or Resin B can be obtained by subjecting vinylidene fluoride, hexafluoropropylene, and a desired monomer to emulsion polymerization or suspension polymerization.

(Inorganic Filler)

The adhesive porous layer further preferably contains an inorganic filler. Inclusion of an inorganic filler may cause lubricity and/or thermal resistance of the separator to improve.

An electrochemically stable inorganic filler stable in an electrolytic solution is preferable as the inorganic filler. Specific examples of the inorganic filler include: metal hydroxides such as magnesium hydroxide, aluminum hydroxide, calcium hydroxide, chromium hydroxide, zirconium hydroxide, cerium hydroxide, nickel hydroxide, and boron hydroxide; metal oxides such as magnesium oxide, alumina ($Al_2O_3$), boehmite (alumina monohydrate), titania, silica, zirconia, and barium titanate; carbonates such as magnesium carbonate and calcium carbonate; sulfates such as magnesium sulfate, calcium sulfate, and barium sulfate; metal fluorides such as magnesium fluoride and calcium fluoride; and clay minerals such as calcium silicate and talc.

One kind of an inorganic filler may be used singly, or two or more kinds thereof may be used in combination. The surface of the inorganic filler may be modified using, for instance, a silane coupling agent.

Of the above, an electrochemically stable inorganic filler stable in an electrolytic solution is preferable as the inorganic filler. Among them, a magnesium-based filler is particularly preferable. The magnesium-based filler is preferable from the viewpoint of suppressing gas generation.

For instance, magnesium hydroxide, magnesium oxide, or magnesium sulfate is suitable as the magnesium-based filler.

The inorganic filler preferably has an average particle diameter of from 0.1 μm to 0.7 μm. If the average particle diameter is 0.1 μm or greater, a porous structure is easily formed during a separator manufacturing process. In addition, if the average particle diameter is 0.7 μm or less, it is advantageous in thinning of the adhesive porous layer. Then, the packing density of the inorganic filler and the resin in the adhesive porous layer is increased and, at the same time, the strength of bonding to an electrode can be enhanced by combining the above-described resins A and B.

The average particle diameter of the inorganic filler is still more preferably from 0.3 μm to 0.7 μm and particularly preferably from 0.3 μm to 0.5 μm.

The average particle diameter is a value measured by using a laser diffraction particle size analyzer and may be measured using, for instance, a Mastersizer 2000, manufactured by Sysmex Corporation. Specifically, the average particle diameter is a center particle size (D50) in the volume particle size distribution of a dispersion in which an inorganic filler, water (dispersion medium), and a nonionic surfactant (Triton X-100; a dispersant) are mixed and dispersed.

In addition, the inorganic filler preferably has a particle size distribution of 0.1 μm<d90–d10<3 μm. As used herein, the "d10" represents the particle diameter (μm) where the cumulative volume is 10 mass %, as calculated from the small particle side in the particle size distribution obtained by laser diffraction; the "d90" represents the particle diameter (μm) where the cumulative volume is 90 mass %. The particle size distribution is a value measured by using a laser diffraction particle size analyzer and may be measured using, for instance, a Mastersizer 2000, manufactured by Sysmex Corporation. To conduct the measurement, water is used as a dispersion medium and a dispersion, in which water, an inorganic filler, and a nonionic surfactant (Triton X-100; a dispersant) are mixed and dispersed, is used.

The shape of the inorganic filler has no limitation and may be a semi-spherical shape or a sheet-like or fibrous shape. Among them, the inorganic filler is preferably sheet-like particles or non-aggregate primary particles from the viewpoint of suppressing a battery short circuit.

One kind of an inorganic filler in the adhesive porous layer may be included singly, or two or more kinds thereof may be mixed and included.

The content of inorganic filler included in the adhesive porous layer is preferably from 40% by volume to 85% by volume of the total solid content of the adhesive porous layer. When the filler content is 40% by volume or higher, the separator thermal resistance and cell strength should be further improved as well as the battery safety should also be secured. When the filler content is 85% by volume or lower, the moldability and shape of the adhesive porous layer are preserved, contributing to an increase in the cell strength. The filler content with respect to the total solid content of the adhesive porous layer is more preferably 45% by volume or higher and still more preferably 50% by volume or higher, and more preferably 80% by volume or lower and still more preferably 75% by volume or lower.

(Additional Component)

A separator of the disclosure may contain an additional component other than the above PVDF type resin and the inorganic filler. Any one kind of the additional component may be used singly, or two or more kinds thereof may be mixed and used.

[Resin Other than PVDF Type Resin]

An adhesive porous layer in the disclosure may contain a polyvinylidene fluoride type resin(s) other than the PVDF type resin and an additional resin(s) except for the polyvinylidene fluoride type resin(s).

Examples of the polyvinylidene fluoride type resin(s) other than the PVDF type resin include: a vinylidene fluoride homopolymer (i.e., polyvinylidene fluoride); or a copolymer with vinylidene fluoride and at least one kind selected from tetrafluoroethylene, trifluoroethylene, chlorotrifluoroethylene, vinyl fluoride, trichloroethylene, or the like.

Examples of the additional resin(s) except for the polyvinylidene fluoride type resin(s) include fluorine-based rubber, an acrylic resin, a styrene-butadiene copolymer, a homopolymer or copolymer of vinyl nitrile compound (e.g., acrylonitrile, methacrylonitrile), carboxymethyl cellulose, hydroxyalkyl cellulose, polyvinyl alcohol, polyvinyl butyral, polyvinyl pyrrolidone, or polyether (e.g., polyethylene oxide, polypropylene oxide).

[Organic Filler]

A separator of the disclosure may contain, in addition to the inorganic filler, an organic filler.

Examples of the organic filler include a crosslinked acrylic resin such as crosslinked polymethyl methacrylate or crosslinked polystyrene. Crosslinked polymethyl methacrylate is preferable.

[Additive]

An adhesive porous layer in the invention may contain an additive(s) such as a dispersant such as a surfactant, a wetting agent, a defoamer, and/or a pH modifier. The dispersant is added to a coating liquid for forming the adhesive porous layer so as to increase dispersibility, coatability, and storage stability. The wetting agent, the defoamer, or the pH modifier is added to a coating liquid for forming the adhesive porous layer so as to be well fit to a porous substrate, to inhibit air biting in the coating liquid, or to adjust the pH, respectively.

The adhesive porous layer preferably has a porosity of from 40% to 70%.

If the porosity is 40% or higher, it is advantageous in retaining ion permeability. In addition, if the porosity is 70% or lower, it is advantageous in securing mechanical properties durable during heat press while providing adhesion to an electrode.

The average pore diameter of the adhesive porous layer is preferably from 10 nm to 200 nm, more preferably from 20 nm to 100 nm. When the average pore diameter is 10 nm or more (preferably 20 nm or more), even in the case that the adhesive porous layer is impregnated with the electrolyte solution, and the resin contained in the adhesive porous layer swells, the clogging of the pores is unlikely to occur. Meanwhile, when the average pore diameter is 200 nm or less (preferably 100 nm or less), the non-uniformity of the open pores on the adhesive porous layer surface is suppressed, so that the bonding points are evenly scattered, thereby having better adhesiveness to the electrode. In addition, when the average pore diameter is 200 nm or less (preferably 100 nm or less), the uniformity of ionic migration is high, thereby having better cycle characteristics and load characteristics of the battery.

The average pore diameter (nm) of the adhesive porous layer is calculated by the following equation, assuming that all the pores are cylindrical:

$$d = 4\ V/S$$

wherein d represents the average pore diameter (diameter) of the adhesive porous layer; V represents the pore volume per 1 m² of the adhesive porous layer; and S represents the pore surface area per 1 m² of the adhesive porous layer.

The pore volume, V per 1 m² of the adhesive porous layer is calculated from the porosity of the adhesive porous layer.

The pore surface area, S per 1 m² of the adhesive porous layer is calculated as follows:

First, the specific surface area (m²/g) of the porous substrate and the specific surface area (m²/g) of the separator are calculated from nitrogen gas adsorption amount, by applying a BET equation as a nitrogen gas adsorption method. This specific surface area (m²/g) is multiplied by each of the basis weights (g/m²) to calculate each of the pore surface areas per 1 m². Further, the pore surface area per 1 m² of the porous substrate is subtracted from the pore surface area per 1 m² of the separator, thereby calculating the pore surface area, S per 1 m² of the adhesive porous layer.

[Characteristics of Separator for Non-Aqueous Secondary Battery]

The separator of the disclosure has a thickness of preferably from 5 μm to 35 more preferably from 5 μm to 30 still more preferably from 5 μm to 25 still more preferably from 5 μm to 20 from the viewpoint of the balance among mechanical strength, energy density of a battery, and output characteristics.

It is preferred that the porosity of the separator of the disclosure is from 30% to 60%, from the viewpoint of mechanical strength, adhesiveness to the electrode, and ion permeability.

The Gurley value (JIS P8117:2009) of the separator of the disclosure is preferably from 50 sec/100 ml to 800 sec/100 ml, more preferably from 50 sec/100 ml to 450 sec/100 ml, from the viewpoint of good balance between mechanical strength and film resistance.

The separator of the disclosure has the value obtained by subtracting the Gurley value of the porous substrate from the Gurley value of the separator (in a state that the adhesive porous layer is formed on the porous substrate) (hereinafter, referred to as "Gurley value difference") is preferably 300 sec/100 ml or less, more preferably 150 sec/100 ml or less, still more preferably 100 sec/100 ml or less, from the viewpoint of ion permeability. With the Gurley value difference of 300 sec/100 ml or less, the adhesive porous layer is not excessively dense, and the ion permeability is well-maintained, thereby obtaining excellent battery characteristics. Meanwhile, the Gurley value difference is preferably 0 sec/100 ml or more, and for increasing the adhesive strength between the adhesive porous layer and the porous substrate, preferably 10 sec/100 ml or more.

It is preferred that the film resistance of the separator of the disclosure is from 1 ohm·cm² to 10 ohm·cm², from the viewpoint of the load characteristics of the battery. Herein, the film resistance refers to a resistance value when impregnating the separator with the electrolyte solution, and is measured by an alternating current method. Since the film resistance value is varied with the kind of electrolyte solution and the temperature, the value is measured at a temperature of 20° C. or less using a mixed solvent of 1 mol/L of $LiBF_4$-propylene carbonate:ethylene carbonate (mass ratio 1:1) as the electrolyte solution.

The piercing strength of the separator of the disclosure is preferably from 160 gf (1.6 N) to 1,000 gf (9.8 N), more preferably from 200 gf (2.0 N) to 600 gf (5.9 N). The measurement method of the piercing strength of the separator is identical to the measurement method of the piercing strength of the porous substrate.

It is preferred that the thermal shrinkage of the separator of the disclosure at 120° C. is 12% or less in both of MD direction (machine direction) and TD direction (transverse direction), from the viewpoint of the balance between the shape stability and the shutdown property.

It is preferred that the curvature rate of the separator of the disclosure is from 1.2 to 2.8, from the viewpoint of ion permeability.

It is preferred that the moisture amount (by mass) contained in the separator of the disclosure is 1000 ppm or less. As the moisture amount of the separator is smaller, when configuring the battery, the reaction of the electrolyte solution and water may be suppressed, and gas generation in the battery may be suppressed, thereby improving the cycle characteristics of the battery. In this regard, the moisture amount contained in the separator of the disclosure is more preferably 800 ppm or less, still more preferably 500 ppm or less.

[Porous Substrate]

The porous substrate in the disclosure refers to a substrate having pores or voids therein. As the substrate, a microporous film; a porous sheet such as non-woven fabric and paper, composed of a fibrous material; a composite porous sheet in which on a microporous film or a porous sheet, one or more of another porous layer are laminated; and the like may be listed. The microporous film refers to a film having plural micropores therein, having a structure in which these micropores are connected to each other, and allowing gas or liquid to pass from one surface to the other surface.

The porous substrate contains organic materials and/or inorganic materials, having electrical insulation.

It is preferred that the porous substrate contains a thermoplastic resin, from a viewpoint of imparting a shutdown function to the porous substrate. The shutdown function refers to a function of dissolving the material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a non-aqueous secondary battery may be mentioned, and among them, it is preferred to select those having sufficient mechanical properties and ion permeability.

It is preferred that the polyolefin microporous film contains polyethylene, from the viewpoint of exhibiting the shutdown function, and the content of polyethylene is preferably 95% by mass or more with respect to the total mass of the polyolefin microporous film.

It is preferred that the polyolefin microporous film contains polyethylene and polypropylene, from the viewpoint of imparting thermal resistance to the extent that the film is not easily broken when exposed to a high temperature. As the polyolefin microporous film, a microporous film in which polyethylene and polypropylene are present in a mixed state in a layer may be listed. It is preferred that the microporous film contains 95% by mass or more of polyethylene and 5% by mass or less of polypropylene, from the viewpoint of compatibility of the shutdown function and thermal resistance. In addition, from the viewpoint of compatibility of the shutdown function and thermal resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight-average molecular weight (Mw) of from 100,000 to 5,000,000 is preferred. In the case that the polyolefin has a Mw of 100,000 or more, sufficient mechanical properties may be secured. Meanwhile, the polyolefin has a Mw of 5,000,000 or less, the shutdown characteristic is good, and film molding is easy.

The polyolefin microporous film may be manufactured by, for example, the following methods. That is, the method is to extrude a molten polyolefin resin from a T-die to form a sheet, crystallize and elongate the sheet, and further subject the sheet to heat treatment, thereby obtaining a microporous film. Otherwise, the method is to extrude a polyolefin resin melted with a plasticizer such as liquid paraffin from a T-die, cool it to form a sheet, elongate the sheet, extract the plasticizer, and perform heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; thermal resistant resins such as aromatic polyamide, polyimide, polyethersulfone, polysulfone, polyetherketone and polyetherimide; and the like, or paper may be mentioned. Herein, the thermal resistant resin refers to a polymer having a melting point of 200° C. or higher, or a polymer having no melting point and a decomposition temperature of 200° C. or higher.

As used herein, the melting point is a value measured using a differential scanning calorimeter (DSC; Q-200, manufactured by TA Instruments, Inc.).

As the composite porous sheet, a sheet in which a functional layer is laminated on the microporous film or microporous sheet may be mentioned. This composite porous sheet is preferred since a further function may be added by the functional layer. As the functional layer, a porous layer containing a thermal resistant resin, or a porous layer containing a thermal resistant resin and an inorganic filler is preferred, from the viewpoint of imparting thermal resistance. As the thermal resistant resin, aromatic polyamides, polyimides, polyethersulfone, polysulfone, polyetherketones, polyetherimides and the like may be mentioned. As the inorganic filler, metal oxides such as alumina, metal hydroxides such as magnesium hydroxide, and the like may be mentioned. As the method of providing the functional layer on the microporous film or porous sheet, a method of coating the functional layer on the microporous film or porous sheet, a method of bonding the functional layer to the microporous film or porous sheet with an adhesive, a method, a method of thermocompressing the microporous film or porous sheet with the functional layer, and the like may be mentioned.

The porous substrate may be subjected to various surface treatments within the range of not impairing the nature of the porous substrate, for the purpose of improving wettability with the coating liquid for forming the adhesive porous layer. As the surface treatment, corona treatment, plasma treatment, flame treatment, UV irradiation treatment, and the like may be mentioned.

[Characteristics of Porous Substrate]

The porous substrate may have a thickness of, preferably from 3 μm to 25 μm, more preferably from 5 μm to 25 μm, still more preferably from 5 μm to 20 μm, from the viewpoint of obtaining good mechanical properties and internal resistance.

It is preferred that the porosity of the porous substrate is from 20 to 60%, from the viewpoint of obtaining proper film resistance or shutdown function.

The Gurley value (JIS P8117:2009) of the porous substrate is preferably from 50 sec/100 ml to 800 sec/100 ml, more preferably from 50 sec/100 ml to 400 sec/100 ml, from the viewpoint of preventing short circuit a battery or obtaining sufficient ion permeability.

The piercing strength of the porous substrate is preferably 200 g or more, more preferably 300 g or more, from the viewpoint of improving a production yield. The piercing strength of the porous substrate is measured by performing a piercing test under the condition of a curvature radius of a needle tip of 0.5 mm, and a piercing speed of 2 mm/sec, using a KES-G5 handy compression tester from KATO TECH CO., LTD., to obtain a maximum piercing load (g).

It is preferred that the porous substrate has an average pore diameter of from 20 nm to 100 nm. When the porous substrate has an average pore diameter of 20 nm or more, ions are easily migrated, so that good battery performance is easily obtained. In this regard, the porous substrate has an average pore diameter of more preferably 30 nm or more, still more preferably 40 nm or more. Meanwhile when the porous substrate has an average pore diameter of 100 nm or less, peel strength between the porous substrate and the adhesive porous layer may be improved, and a good shutdown function may be exhibited. In this regard, the porous substrate may have an average pore diameter of more preferably 90 nm or less, still more preferably 80 nm or less. The average pore diameter of the porous substrate is a value measured using a Perm porosimeter, and for example, may be measured using a Perm porosimeter (available from PMI, CFP-1500-A), in accordance with ASTM E1294-89.

[Manufacturing Method of Separator for Non-Aqueous Secondary Battery]

The separator of the disclosure is manufactured, for example, by coating a coating liquid containing a PVDF type resin on the porous substrate to form a coated layer, and then solidifying the PVDF type resin contained in the coated layer, thereby forming the adhesive porous layer on the porous substrate. Specifically, the adhesive porous layer may be formed, for example, by the following wet coating method.

The wet coating method is a film forming method to sequentially perform the following processes: (i) a coating liquid preparation process of dissolving or dispersing a PVDF type resin in a solvent to prepare the coating liquid, (ii) a coating process of coating the coating liquid on a porous substrate to form a coated layer, (iii) a solidification process of contacting the coated layer with the coagulating solution to cause phase separation, while solidifying the PVDF type resin, thereby obtaining a composite membrane having an adhesive porous layer on the porous substrate, (iv) a washing process of washing the composite membrane with water, and (v) a drying process of removing water from the composite membrane. The details of the wet coating method preferred for the separator of the disclosure is as follows.

As the solvent dissolving or dispersing the PVDF type resin (hereinafter, referred to as "good solvent"), used in the preparation of the coating liquid, polar amide solvents such as N-methyl-2-pyrrolidone (NMP), dimethylacetamide (DMAc), dimethyl formamide, and dimethyl formamide are preferably used.

From the viewpoint of forming an adhesive porous layer having a good porous structure, it is preferred that a phase separating agent causing phase separation is mixed with the good solvent. As the phase separating agent, water, methanol, ethanol, propyl alcohol, butyl alcohol, butandiol, ethylene glycol, propylene glycol, tripropylene glycol (TPG), etc. may be listed. It is preferred that the phase separating agent is mixed with the good solvent within a range of securing suitable viscosity for coating.

As the solvent used in the preparation of the coating liquid, a mixed solvent containing 60% by mass or more of the good solvent, and from 5% by mass to 40% by mass of the phase separating agent is preferred, from the viewpoint of forming the adhesive porous layer having a good porous structure.

It is preferred that the concentration of the PVDF type resin in the coating liquid is from 3% by mass to 10% by mass with respect to the total mass of the coating liquid, from the viewpoint of forming the adhesive porous layer having a good porous structure.

In the case of containing a filler and/or other components in the adhesive porous layer, the filler and other component may be dissolved or dispersed in the coating liquid.

The coating liquid may contain a dispersing agent such as a surfactant, a wetting agent, a defoamer, a pH adjusting agent, or the like. These additives may remain in the adhesive porous layer, if it is electrochemically stable and does not inhibit the reaction in the battery in the use range of the non-aqueous secondary battery.

A coagulating solution is generally composed of a good solvent used in the preparation of the coating liquid, a phase separating agent and water. It is preferred for production that the mixing ratio of the good solvent and the phase separating agent is adjusted to the mixing ratio of the mixed solvent used in the preparation of the coating liquid. It is preferred for formation of a porous structure and production that the water content of the coagulating solution is from 40% by mass to 90% by mass.

For coating the coating liquid on the porous substrate, a conventional coating manner using a Meyer bar, a die coater, a reverse roll coater, a gravure coater, etc. may be applied. When forming the adhesive porous layer on both surfaces of the porous substrate, it is preferred to coat the coating liquid simultaneously on both surfaces of the substrate, from the viewpoint of production.

The adhesive porous layer may be prepared by a dry coating method, as well as the wet coating method as described above. The dry coating method is a method to obtain the adhesive porous layer, by coating the coating liquid containing the PVDF type resin and the solvent on the porous substrate, and drying this coated layer to remove the solvent by volatilization. However, since the coated layer is more likely to be dense by the dry coating method, as compared with the wet coating method, the wet coating method is preferred for obtaining a good porous structure.

The separator of the disclosure may be also manufactured by the method of manufacturing the adhesive porous layer as an independent sheet, superimpose this adhesive porous layer on the porous substrate, and forming a composite by thermocompression or an adhesive. As the method of manufacturing the adhesive porous layer as an independent sheet, the method of applying a wet coating method or a dry coating method as described above, and forming the adhesive porous layer on the peeling sheet, may be listed.

<Non-Aqueous Secondary Battery>

The non-aqueous secondary battery of the disclosure is a non-aqueous secondary battery obtaining electromotive force by lithium doping and dedoping, and has a positive electrode; a negative electrode; and the separator for a non-aqueous secondary battery of the disclosure disposed between the positive electrode and the negative electrode. Doping means occlusion, supporting, adsorption or insertion, and a phenomenon in which lithium ions enter the active substance of the electrode such as a positive electrode.

The non-aqueous secondary battery of the disclosure has a structure in which, for example, a battery element having the positive electrode and the negative electrode facing each other through the separator is enclosed together with the electrolyte solution inside of the exterior material. The non-aqueous secondary battery of the disclosure is preferred for particularly a lithium ion secondary battery. Use of the separator excellent in bonding to an electrode(s) according to the disclosure enables a non-aqueous secondary battery of the disclosure to be manufactured efficiently. The non-aqueous secondary battery of the disclosure, including the separator excellent in bonding to an electrode(s) according to the disclosure, excels in the cell strength.

Hereinafter, the exemplary forms of the positive electrode, the negative electrode, the electrolyte solution, and the exterior materials provided in the non-aqueous secondary battery of the disclosure will be described.

The positive electrode may have a structure in which an active substance layer containing the positive electrode active substance and the binder resin is formed on the current collector. The active substance layer may further contain a conductive aid. The example of the positive electrode active substance may include a lithium-containing transition metal oxide and the like, and specifically, $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, $LiAl_{1/4}Ni_{3/4}O_2$, etc. The example of the binder resin may include a polyvinylidene fluoride type resin. The example of the conductive aid may include carbon materials such as acetylene black, ketjen black, graphite powder and the like. The example of the current collector may include aluminum foil, titanium foil, stainless steel foil and the like having a thickness of from 5 μm to 20 μm.

According to an embodiment of the separator of the disclosure, the adhesive porous layer has excellent oxidation resistance, and thus, by disposing the adhesive porous layer in the positive electrode side of the non-aqueous secondary battery, it is easy to apply $LiMn_{1/2}Ni_{1/2}O_2$, $LiCo_{1/3}Mn_{1/3}Ni_{1/3}O_2$, etc. which may be operated at high voltage of 4.2 V or more, as the positive electrode active substance.

The negative electrode may have a structure in which the active substance layer containing the negative electrode active substance and the binder resin is formed on the current collector. The active substance layer may further contain a conductive aid. As the negative electrode active substance, a material capable of electrochemically occluding lithium, specifically for example, carbon materials; an alloy of lithium with silicon, tin, aluminum, etc.; and the like may be listed. As the binder resin, for example, a polyvinylidene fluoride type resin, a styrene-butadiene copolymer and the like may be listed. The example of the conductive aid may include carbon materials such as acetylene black, ketjen black, graphite powder and the like. The example of the current collector may include copper foil, nickel foil, stainless foil and the like having a thickness of from 5 μm to 20 μm. In addition, instead of the negative electrode, metal lithium foil may be used as the negative electrode.

It is preferred that the electrode contains more binder resin in the active substance layer, from the viewpoint of adhesiveness to the separator. Meanwhile, from the viewpoint of increasing energy density of the battery, it is preferred to contain more active substance in the active substance layer, and it is preferred to contain a relatively small amount of the binder resin. Since the separator of the disclosure has excellent adhesion to the electrode, it is possible to decrease the amount of the binder resin in the active substance layer, thereby increasing the amount of the active substance, and thus, increasing the energy density of the battery. The non-aqueous secondary battery of the disclosure has excellent adhesion to the negative electrode using a water-based binder (specifically a styrene-butadiene copolymer), as well as the negative electrode using a solvent-based binder (specifically a polyvinylidene fluoride type resin), by applying the separator of the disclosure.

The electrolyte solution is a solution of a lithium salt dissolved in a non-aqueous solvent. The example of the lithium salt includes $LiPF_6$, $LiBF_4$, $LiClO_4$ and the like. The example of the non-aqueous solvent includes cyclic carbonates such as ethylene carbonate, propylene carbonate, fluoroethylene carbonate, difluoroethylene carbonate and vinylene carbonate; chain carbonates such as dimethyl carbonate, diethyl carbonate, ethylmethyl carbonate and a fluorine substituent thereof; cyclic esters such as γ-butyrolactone and γ-valerolactone; and the like, and these may be used alone, or in combination. As the electrolyte solution, it is preferred to mix the cyclic carbonate and the chain carbonate in a mass ratio (cyclic carbonate:chain carbonate) of from 20:80 to 40:60, and dissolve the lithium salt at from 0.5 mol/L to 1.5 mol/L.

As the exterior materials, a metal can, a pack made of an aluminum laminate film, or the like may be listed. The shape of the battery may be a square, a cylinder, a coin, or the like, but the separator of the disclosure is preferred for any shape.

<Method of Manufacturing Non-Aqueous Secondary Battery>

In a non-aqueous secondary battery-manufacturing method of the disclosure, the following processes are carried out in this order.
(i) Process of disposing, between a positive electrode and a negative electrode, the above-described separator for a non-aqueous secondary battery according to the disclosure to produce a layered body.
(ii) Process of housing the layered body inside an exterior material, injecting an electrolyte solution into an inside of the exterior material, and then sealing the exterior material to produce a battery element.
(iii) Process of subjecting the battery element to heat pressing at an appropriate temperature to bond the separator for a non-aqueous secondary battery to the positive electrode and/or the negative electrode.

In the process (i), the disposition of the separator between the positive electrode and the negative electrode may be carried out in the manner of layering the positive electrode, the separator and the negative electrode in this order by at least one layer (so called, stack manner), or in the manner of superimposing the positive electrode, the separator, the negative electrode and the separator in this order, and winding them in a longitudinal direction.

In process (ii), the layered body is housed inside an exterior material, and heat press (dry heat press) may be performed before an electrolyte solution is injected. In this case, because the electrode(s) and the separator are bonded before the layered body is housed in the exterior material, layered body deformation occurring during transfer for housing the layered body in the exterior material is suppressed. In addition, the layered body is further subjected to wet heat press in process (iii) while a PVDF type resin included in the adhesive porous layer of the separator is swelling in an electrolyte solution. This may cause the bonding between the electrode(s) and the separator to be more rigid. The wet heat press in this case may be performed under mild conditions in which the electrode-separator bonding, somehow weakened by impregnation in the electrolyte solution, is restored to some extent. That is, the temperature during the wet heat press can be set to a relatively low temperature. Thus, it is possible to suppress gas generation caused by electrolyte solution and electrolyte decomposition in a battery at the time of manufacturing the battery. In dry heat press conditions, the pressing pressure is preferably from 0.2 MPa to 9 MPa and the temperature is preferably from 20° C. to 100° C. Of course, in process (ii), it is just possible that without performing the dry heat press, the layered body is housed inside an exterior material, an electrolyte solution is injected into an inside of the exterior material, and the exterior material is then sealed to produce a battery element.

In process (iii), the battery element produced in process (ii) is subjected to wet heat press. By doing so, the layered body is hot-pressed while a PVDF type resin included in the adhesive porous layer of the separator is swelling in the electrolyte solution. This causes the electrodes and the separator to be bonded well, so that a non-aqueous secondary battery excellent in cell strength and battery properties can be obtained.

In the wet heat press conditions in process (iii), the pressing pressure is preferably from 0.2 MPa to 2 MPa and the temperature is preferably from 60° C. to less than 90° C.

EXAMPLES

Hereinbelow, the invention will be further specifically described with reference to Examples. However, the invention is not limited to the following Examples as long as the scope of the invention is not exceeded.

<Measurement and Evaluation Procedures>

Measurement and evaluation procedures adopted in Examples and Comparative Examples are as follows.

[Percentages of Copolymerization Components in Polyvinylidene Fluoride Type Resin]

Nuclear magnetic resonance (NMR) spectra were measured to determine the percentages of copolymerization components in a polyvinylidene fluoride type resin from the ratio of intensities of peaks attributed to the respective copolymerization components. Specifically, 10 mg of a polyvinylidene fluoride type resin was dissolved at 100° C. in 0.6 mL of heavy dimethyl sulfoxide. Then, $^{19}$F-NMR spectra at 100° C. and $^1$H-NMR spectra at room temperature were each measured.

[Molecular Weight of Polyvinylidene Fluoride Type Resin]

The weight-average molecular weight (Mw) and the number-average molecular weight (Mn) of polyvinylidene fluoride type resin were measured by gel permeation chromatography (GPC).

For the measurement, a GPC apparatus "GPC-900", manufactured by JASCO Corporation, was used, two TSKgel SUPER AWM-H columns, manufactured by TOSOH corporation, were used, and a solvent dimethylformamide was used. The measurement was conducted under conditions at a temperature of 40° C. and a flow rate of 0.6 mL/min, and the molecular weight in terms of polystyrene was calculated.

[Acid Value of Polyvinylidene Fluoride Type Resin]

The acid value of the polyvinylidene fluoride type resin was measured using a potentiometric titrator, AT-500 N (product available from Kyoto Electronics Co., Ltd.), and a composite glass electrode (product available from Kyoto Electronics Industry Co., Ltd.), based on JIS K1557-5:2007 (potentiometric titration method). The specific measurement order is as follows:
(i) To a 100 mL Erlenmeyer flask, 0.4 g of a polyvinylidene fluoride type resin and 80 mL of acetone were added, and heated with a hot water bath to dissolve the polyvinylidene fluoride type resin in acetone, thereby manufacturing a sample.
(ii) The sample was titrated using a potentiometric titrator, and the inflection point of the obtained titration curve was defined as an end point (titration solution amount in the present test). 0.02 mol/L KOH of an ethanol solution was used as a titration solution.

(iii) In the same manner, a blank test was carried out using the sample not including the polyvinylidene fluoride type resin, thereby calculating the acid value by the following Equation:

Acid value (mgKOH/g)=$(V1-V0) \times N \times 56.1 \times f \div S$

V1: titration solution amount (mL) in the actual test,
V0: titration solution amount (mL) in the blank test,
N: concentration of the titration solution (mol/L),
f: factor of the titration solution=0 958
S: sample amount (g) of the polyvinylidene fluoride type resin

[Coating Amount of Adhesive Porous Layer]

First, a separator was cut into 10 cm×10 cm, the mass of which was then measured. The measured value was divided by the area to calculate the basis weight of the separator. Also, a porous substrate used for manufacturing the separator was cut into 10 cm×10 cm, the mass of which was then measured. The measured value was divided by the area to calculate the basis weight of the porous substrate.

Then, the basis weight of the porous substrate was subtracted from the basis weight of the separator to calculate the coating amount of the adhesive porous layer (when both sides of the porous substrate each had an adhesive porous layer, the coating amount was the total coating amount of the two layers).

[Thickness]

The thicknesses of the porous substrate and the separator were measured with a contact thickness meter (LITEMATIC, manufactured by Mitutoyo Corporation) having a cylindrical measurement terminal with a diameter of 5 mm. The measurement was adjusted so as to apply a load of 7 g, and 20 random points within 10 cm×10 cm were measured and averaged.

The thickness of the adhesive porous layer was determined by subtracting the thickness of the porous substrate from the thickness of the separator.

[Porosity]

The porosity of each of the porous substrate and the separator was determined according to the following calculation method.

In a case in which constituent materials are a, b, c, ..., n; the masses of each of the constituent materials are Wa, Wb, Wc, ..., Wn (g/cm$^2$); the true densities of each of the constituent materials are da, db, dc, ..., dn (g/cm$^3$), and the thickness is t (cm), the porosity ε (%) is determined by the following formula.

ε={1−$(Wa/da+Wb/db+Wc/dc+ \ldots +Wn/dn)/t$}×100

[Gurley Value]

The Gurley value [unit: sec/100 ml] of the porous substrate or the separator was measured with a Gurley type densometer (G-B2C, manufactured by Toyo Seiki Seisakusho, Ltd.) in accordance with JIS P8117:2009.

[Average Particle Size of Inorganic Filler]

An inorganic filler was dispersed in water containing a nonionic surfactant Triton X-100, and the particle size distribution was determined using a laser diffraction particle size analyzer (Mastersizer 2000, manufactured by Sysmex Corporation). In the volume-based particle size distribution, the particle size (D50) that corresponded to 50% cumulative volume from the small size side was defined as the volume average particle size (μm) of the inorganic filler.

[Cell Strength after Wet Heat Press]

First, 94 g of a positive electrode active substance lithium cobalt oxide powder, 3 g of a conductive aid acetylene black, and 3 g of a binder polyvinylidene fluoride were dissolved in N-methyl-pyrrolidone to have a concentration of polyvinylidene fluoride of 5% by mass. The mixture was stirred with a double-arm mixer to prepare a slurry for positive electrode. This slurry for positive electrode was coated on one side of aluminum foil with a thickness of 20 μm and pressed after drying to yield a positive electrode having a positive electrode active substance layer.

Next, 300 g of a negative electrode active substance artificial graphite, 7.5 g of a water-soluble dispersion containing 40% by mass of a modified styrene-butadiene copolymer, which is a binder, 3 g of a thickener carboxymethyl cellulose, and an appropriate volume of water were stirred and mixed with a double-arm mixer to produce a slurry for negative electrode. This slurry for negative electrode was coated on copper foil with a thickness of 10 μm as a negative electrode current collector and pressed after drying to yield a negative electrode having a negative electrode active substance layer.

The positive electrode and the negative electrode (with a length of 70 mm and a width of 30 mm) were stacked and layered while each separator was interposed. Then, lead tabs were welded to obtain a battery element. This battery element was housed in an aluminum laminated film-made package, soaked in an electrolytic solution, and hot-pressed (wet heat pressed) under conditions below. Then, the outer package was sealed to manufacture a secondary battery (with a thickness of 1.1 mm) for testing.

Here, 1 mol/L LiPF$_6$-ethylene carbonate:ethyl methyl carbonate (mass ratio of 3:7) was used as the electrolytic solution.

The above-manufactured secondary battery for testing was subjected to a three-point bending test according to ISO-178, and the battery strength (cell strength) was evaluated.

Press condition 1: a pressure of 1 MPa, a temperature of from 60 to 90° C., and a duration of 2 min.

Press condition 2: a pressure of 1 MPa, a temperature of 70° C., and a duration of from 10 min to 2 h.

[Bonding Strength after Dry Heat Press]

A negative electrode (with a length of 70 mm and a width of 15 mm), a separator (with a length of 74 mm and a width of 18 mm), and a release paper (with a length of 70 mm and a width of 15 mm) as manufactured by substantially the same procedure as in the case of the above "Cell Strength" were stacked to form a layered body. Next, the layered body was housed in an aluminum-laminated film-made package, and was then hot-pressed. This caused the negative electrode and the separator to be bonded.

At that time, the hot press conditions were at a temperature of 90° C. and a pressure of 9 MPa and for a duration of 10 sec. After that, the layered body was collected from the package, the release paper was peeled to prepare a measurement sample.

A non-coated side of the negative electrode of the measurement sample was immobilized onto a metal plate by using a double sided tape. Then, the metal plate was fixed to a lower chuck of a tensilon (STB-1225S, manufactured by A&D Company). At that time, the metal plate was fixed to the tensilon such that the length direction of the measurement sample was set to the gravity direction. The separator was peeled, about 2 cm relative to its lower edge, from the negative electrode, and the edge was fixed to an upper chuck, such that the tensile angle (the angle of the separator relative to the measurement sample) was set to 180 degrees.

The separator was pulled at a tensile rate of 20 mm/min, and the load when the separator was peeled from the negative electrode was measured. Each load at from 10 mm, where the measurement was started, to 40 mm was sampled while the interval was 0.4 mm, and was then averaged to give the strength of bonding to the electrode after dry heat press.

[Cycle Characteristics of Battery]

—To Manufacture Positive Electrode—

First, 91 g of a positive electrode active substance lithium cobalt oxide powder, 3 g of a conductive aid acetylene black, and 3 g of a binder polyvinylidene fluoride were dissolved in N-methyl-pyrrolidone to have a concentration of polyvinylidene fluoride of 5% by mass. The mixture was stirred with a double-arm mixer to prepare a slurry for positive electrode. This slurry for positive electrode was coated on one side of aluminum foil with a thickness of 20 μm and pressed after drying to yield a positive electrode (having one side coated) having a positive electrode active substance layer.

—To Manufacture Negative Electrode—

A negative electrode (having one side coated) was manufactured by substantially the same method as in the case of the above "Cell Strength".

—Test for Evaluating Yield in Manufacture of Battery—

Two separators (with a width of 108 mm) were provided and stacked. One end in the MD direction was wound around a stainless steel-made core. A positive electrode (with a width of 106.5 mm) having a lead tab welded was sandwiched between the two separators, and a negative electrode (with a width of 107 mm) having a lead tab welded was placed on one of the separators. The layered body as so manufactured was wound, and 60 wound electrode bodies were produced consecutively. The produced wound electrode bodies were each hot-pressed (dry heat pressed) with a hot press machine under conditions at a load of 1 MPa and a temperature of 90° C. for a pressing duration of 30 sec to yield a battery element. The resulting battery element was housed in an aluminum laminated film-made package, soaked in an electrolytic solution, and sealed using a vacuum sealer. Here, 1 mol/L ethylene carbonate:ethyl methyl carbonate (mass ratio of 3:7) was used as the electrolytic solution.

After that, the aluminum laminated film-made package housing the battery element and the electrolytic solution was hot pressed (wet heat pressed) with a hot press machine to manufacture each of 60 secondary batteries for testing. The wet heat press conditions are as follows.

Condition 1: a load of 1 MPa, a pressing temperature of 90° C., and a pressing duration of 2 min.

Condition 2: a load of 1 MPa, a pressing temperature of 60° C., and a pressing duration of 2 min.

Condition 3: a load of 1 MPa, a pressing temperature of 70° C., and a pressing duration of 1 h.

The 60 secondary batteries for testing were each subjected to 100 cycles of charging and discharging.

During the testing, the charging was charging at a constant current of 0.5 C and a constant voltage of 4.2 V and the discharging was discharging at a constant current of 0.5 C and with a cutoff of 2.75 V. The thickness of each secondary battery for testing was measured before and after the cycle testing. Then, when a change in the thickness was 5% or less, the battery was determined to pass the testing. By contrast, when a change in the thickness exceeds 5%, the battery was determined to fail the testing. Then, the number/percentage (%) of the passed secondary batteries for testing was calculated and grouped in accordance with the following standard.

<Standard>

A: The passed number/percentage is 100%.

B: The passed number/percentage is from 95% to less than 100%.

C: The passed number/percentage is from 90% to less than 95%.

D: The passed number/percentage is less than 90%.

Example 1

As resin A (a polyvinylidene fluoride (PVDF) type resin), a copolymer was provided in which vinylidene fluoride (VDF), hexafluoropropylene (HFP), and acrylic acid (AA; a monomer represented by formula (1)) were copolymerized (at VDF/HFP/AA=96.5/2.4/1.1 [mol %]). Note that the resin A had a melting point of 152° C., a weight-average molecular weight (Mw) of 1,100,000, and an Mw/Mn of 2.8.

Note that the melting point was measured using a differential scanning calorimeter (DSC; Q-200, manufactured by TA Instruments, Inc.).

In addition, as resin B (a polyvinylidene fluoride (PVDF) type resin), a copolymer was provided in which vinylidene fluoride (VDF), hexafluoropropylene (HFP), and acrylic acid (AA; a monomer represented by formula (1)) were copolymerized (at VDF/HFP/AA=94.6/5.2/0.2 [mol %]). Note that the resin B had a melting point of 150° C., a weight-average molecular weight (Mw) of 500,000, and an Mw/Mn of 3.4.

Note that the melting point was measured by the same method as for the above resin A.

The resin A and resin B as so prepared were dissolved, at a ratio of 70:30 [mass ratio] to have a concentration of 5 mass %, in a mixed solvent of dimethylacetamide and tripropylene glycol (dimethylacetamide:tripropylene glycol=80:20 [mass ratio]). Magnesium hydroxide ($Mg(OH)_2$, trade name: MAGSEEDS HS-6M, manufactured by Konoshima Chemical Co., Ltd., with an average particle diameter (D50) of 0.5 μm) was further added as a filler, and the mixture was stirred homogenously to prepare a coating liquid for forming an adhesive porous layer, in which coating liquid the PVDF type resin and $Mg(OH)_2$ were at a mass ratio of 50:50.

An equal amount of the prepared coating liquid was used to coat both sides of a polyethylene (PE) microporous film (with a film thickness of 9 μm, a porosity of 36%, and a Gurley value of 162 sec/100 ml). The film was soaked and then solidified in solidifier liquid (water:dimethylacetamide:tripropylene glycol=62:30:8 [mass ratio] at a temperature of 40° C.).

Subsequently, this polyethylene microporous film was water-washed and then dried to manufacture a separator having adhesive porous layers formed on both sides of the polyethylene microporous film.

Note that when the resin A and the resin B were mixed at the above ratio and the GPC measurement was carried out, the Mw/Mn was 3.0.

In addition, the adhesive porous layer coating amount was 2 g/m$^2$ after the amounts of the adhesive porous layers formed on the both sides of the polyethylene microporous film were totaled.

Examples 2 to 12

The same procedure as of Example 1 was repeated, except that for instance, the kinds and the contents of the PVDF type resin and the filler as well as the thickness and the physical properties in Example 1 were changed as designated in Table 1, to manufacture separators having adhesive porous layers formed on both sides of the polyethylene microporous film.

Note that in Example 11, as the porous substrate, a polypropylene (PP) microporous film (with a thickness of 25 µm, a porosity of 50%, and a Gurley value of 200 sec/100 ml) was used. In addition, in Example 12, a polyolefin microporous film having a polypropylene (PP)/polyethylene (PE)/polypropylene (PP) three-layer structure (at PP/PE/PP=4 µm thickness/4 µm thickness/4 µm thickness, with a porosity of 44%, and a Gurley value of 245 sec/100 ml) was used.

Comparative Examples 1 to 4

The same procedure as of Example 1 was repeated, except that for instance, the kinds and the contents of the PVDF type resin and the filler as well as the thickness and the physical properties in Example 1 were changed as designated in Table 1, to manufacture separators having adhesive porous layers formed on both sides of the polyethylene microporous film.

TABLE 1

|  | Substrate | Resin A | | | | Resin B1 or B2 | | | Resin A:B [mass ratio] | Resins Acid value [mg KOH/g] *1 |
|---|---|---|---|---|---|---|---|---|---|---|
|  |  | HFP monomer [mol %] | Formula (1) monomer [mol %] | HFP/ (HFP + VDF) [mol %] | Mw | HFP monomer [mol %] | Formula (1) monomer [mol %] | Mw |  |  |
| Example 1 | PE | 2.4 | 1.1 | 2.4 | 1,100,000 | 5.2 | 0.2 | 500,000 | 70:30 | 10 |
| Example 2 | microporous | 3.0 | 0 | 3.0 | 2,000,000 | 4.0 | 0.5 | 600,000 | 50:50 | 5 |
| Example 3 | film | 2.4 | 1.1 | 2.4 | 650,000 | 6.0 | 0.4 | 500,000 | 20:80 | 9 |
| Example 4 |  | 1.5 | 0.5 | 1.5 | 1,300,000 | 10 | 0.1 | 100,000 | 90:10 | 8 |
| Example 5 |  | 2.0 | 2.0 | 2.0 | 900,000 | 3.5 | 1.0 | 850,000 | 60:40 | 19 |
| Example 6 |  | 2.4 | 1.1 | 2.4 | 1,100,000 | 5.2 | 0.2 | 500,000 | 70:30 | 10 |
| Example 7 |  | 1.8 | 0.2 | 1.8 | 1,500,000 | 12 | 0.8 | 700,000 | 80:20 | 15 |
| Example 8 |  | 3.5 | 0.3 | 3.5 | 1,000,000 | 5.2 | 0.2 | 450,000 | 30:70 | 5 |
| Example 9 |  | 1.5 | 0.5 | 1.5 | 1,300,000 | 15 | 0.1 | 200,000 | 50:50 | 6 |
| Example 10 |  | 1.8 | 0.2 | 1.8 | 1,500,000 | 12 | 0.8 | 700,000 | 80:20 | 15 |
| Example 11 | PP microporous film | 1.5 | 0.5 | 1.5 | 1,300,000 | 4.0 | 0.5 | 600,000 | 60:40 | 13 |
| Example 12 | PP/PE/PP | 1.5 | 0.5 | 1.5 | 1,300,000 | 4.0 | 0.5 | 600,000 | 60:40 | 13 |
| Comparative Example 1 | PE microporous | 0.8 | 0.2 | 0.8 | 1,000,000 | 5.2 | 0.2 | 500,000 | 70:30 | 2 |
| Comparative Example 2 | film | 3.8 | 0.2 | 3.8 | 1,000,000 | 5.2 | 0.2 | 500,000 | 70:30 | 1 |
| Comparative Example 3 |  | 3.0 | 0.1 | 3.0 | 1,300,000 | 3.0 | 0.1 | 450,000 | 50:50 | 0 |
| Comparative Example 4 |  | 3.0 | 0.1 | 3.0 | 1,300,000 | 4.5 | 0 | 500,000 | 50:50 | 2 |

|  | Resins Total amount [gm/m²] *2 | Molecular weight distribution (Mw/Mn) of the entirety of resins A and B [Mw/Mn] | Filler | | | Adhesive porous layer | | One side Film thickness [µm] | Separator | |
|---|---|---|---|---|---|---|---|---|---|---|
|  |  |  | Kind | D50 | Content [parts by mass] | Porosity [%] |  |  | Gurley | Thickness [µm] |
| Example 1 | 1.3 | 3.0 | Mg(OH)$_2$ | 0.5 | 50 | 60 |  | 1.5 | 200 | 12 |
| Example 2 | 2.5 | 4.5 | Mg(OH)$_2$ | 0.3 | 70 | 40 |  | 2.5 | 250 | 14 |
| Example 3 | 1.0 | 2.5 | Mg(OH)$_2$ | 0.6 | 50 | 50 |  | 1.3 | 210 | 12 |
| Example 4 | 3.5 | 2.8 | Mg(OH)$_2$ | 0.5 | 40 | 65 |  | 3.0 | 280 | 15 |
| Example 5 | 3.0 | 2.1 | Mg(OH)$_2$ | 0.3 | 80 | 45 |  | 2.5 | 280 | 14 |
| Example 6 | 0.6 | 3.0 | Mg(OH)$_2$ | 0.8 | 60 | 70 |  | 3.3 | 200 | 12 |
| Example 7 | 0.4 | 3.5 | MgO | 0.7 | 30 | 55 |  | 0.3 | 190 | 10 |
| Example 8 | 1.5 | 2.3 | MgO | 1.0 | 60 | 70 |  | 3.0 | 230 | 15 |
| Example 9 | 2.0 | 1.5 | MgO | 0.7 | 50 | 60 |  | 2.0 | 220 | 13 |
| Example 10 | 1.3 | 3.5 | Al$_2$O$_3$ | 0.5 | 50 | 65 |  | 2.0 | 210 | 13 |
| Example 11 | 0.6 | 4.1 | Mg(OH)$_2$ | 0.5 | 30 | 30 |  | 1.2 | 400 | 11 |
| Example 12 | 0.6 | 4.1 | Mg(OH)$_2$ | 0.5 | 90 | 80 |  | 2.3 | 290 | 17 |
| Comparative Example 1 | 2 | 2.9 | Mg(OH)$_2$ | 0.5 | 60 | 60 |  | 2.0 | 190 | 13 |
| Comparative Example 2 | 2 | 2.9 | Mg(OH)$_2$ | 0.5 | 60 | 60 |  | 2.0 | 190 | 13 |
| Comparative Example 3 | 1.5 | 2.2 | Mg(OH)$_2$ | 0.5 | 60 | 60 |  | 2.0 | 180 | 13 |
| Comparative Example 4 | 2.5 | 3.5 | Mg(OH)$_2$ | 0.5 | 60 | 55 |  | 2.5 | 210 | 14 |

TABLE 1-continued

|  | Cell strength (wet heat press for pressing duration of 2 min) [N/15 mm] | | | Cell strength (wet heat press at pressing temperature of 70° C.) [N/15 mm] | | | Bonding strength (dry heat press) [N/15 mm] | Cycle characteristics | | |
|---|---|---|---|---|---|---|---|---|---|---|
|  | 60° C. | 70° C. | 90° C. | 10 min | 60 min | 120 min |  | Condition 1 | Condition 2 | Condition 3 |
| Example 1 | 8 | 10 | 13 | 11 | 12 | 12 | 0.20 | A | A | A |
| Example 2 | 7 | 8 | 8 | 8 | 7 | 7 | 0.11 | A | B | B |
| Example 3 | 6 | 7 | 7 | 6 | 7 | 8 | 0.25 | B | B | B |
| Example 4 | 7 | 9 | 10 | 9 | 10 | 9 | 0.10 | A | B | A |
| Example 5 | 8 | 9 | 9 | 9 | 8 | 8 | 0.13 | A | B | B |
| Example 6 | 5 | 6 | 8 | 6 | 6 | 6 | 0.05 | B | C | C |
| Example 7 | 5 | 6 | 7 | 6 | 6 | 5 | 0.06 | B | C | C |
| Example 8 | 6 | 6 | 8 | 7 | 7 | 6 | 0.09 | C | C | B |
| Example 9 | 6 | 7 | 8 | 7 | 8 | 7 | 0.12 | B | C | A |
| Example 10 | 8 | 9 | 10 | 9 | 8 | 8 | 0.12 | A | B | B |
| Example 11 | 7 | 7 | 10 | 7 | 8 | 6 | 0.09 | A | B | B |
| Example 12 | 5 | 6 | 7 | 6 | 6 | 6 | 0.06 | B | C | C |
| Comparative Example 1 | 3 | 3 | 4 | 3 | 3 | 3 | 0.01 | D | D | D |
| Comparative Example 2 | 3 | 3 | 4 | 3 | 3 | 3 | 0.01 | D | D | D |
| Comparative Example 3 | 3 | 3 | 3 | 3 | 3 | 3 | 0.01 | D | D | D |
| Comparative Example 4 | 3 | 3 | 3 | 3 | 3 | 3 | 0.02 | D | D | D |

*1: The total acid value of resin A and resin B.
*2: The total amount of resin A and resin B1 or the total amount of resin A and resin B2

Table 1 shows that the separators of the Examples excelled in adhesion to an electrode(s) after any of wet heat press or dry heat press, when compared with the Comparative Examples. In addition, favorable adhesion was obtained even when the temperature conditions and the time conditions during the wet heat press were changed. Accordingly, the conditions required for the wet heat press are less restricted, indicating that the conditions are applicable to various battery manufacturing processes.

Then, the batteries in a form of the aluminum laminated film-made package in the Examples had a small shape change and exhibited stable characteristics even when the cycle testing was conducted while the wet heat press conditions (the temperature and the duration) were changed.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:
a porous substrate; and
an adhesive porous layer that is provided on one side or both sides of the porous substrate and contains the following resin A and resin B2, wherein a total acid value of the resin A and the resin B2 is from 3.0 mg KOH/g to 20 mg KOH/g, and wherein a molecular weight distribution (Mw/Mn), which is a ratio of a weight-average molecular weight (Mw) to a number-average molecular weight (Mn), of an entirety of the resin A and the resin B2 is more than 2.0, and wherein a weight-average molecular weight of the resin A is from 700,000 to 3,000,000:

(1) resin A: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 1.5 mol % to 3.5 mol %, and (2) resin B2: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 3.5 mol % to 15 mol %.

2. The separator for a non-aqueous secondary battery according to claim 1, wherein the adhesive porous layer further contains an inorganic filler, and an average particle diameter of the inorganic filler is from 0.1 μm to 0.7 μm.

3. The separator for a non-aqueous secondary battery according to claim 2, wherein the inorganic filler is a magnesium-based filler.

4. The separator for a non-aqueous secondary battery according to claim 1, wherein a total amount of the resin A and the resin B2 in the adhesive porous layer is from 0.6 g/m² to 4.0 g/m².

5. The separator for a non-aqueous secondary battery according to claim 1, wherein a porosity of the adhesive porous layer is from 40% to 70%.

6. The separator for a non-aqueous secondary battery according to claim 1, wherein the resin A further contains, as a monomer component, a monomer represented by the following formula (1):

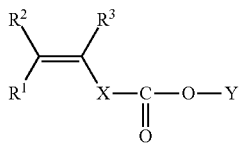

(1)

wherein, in Formula (1), each of $R^1$, $R^2$, and $R^3$ independently represents a hydrogen atom, a halogen atom, a carboxyl group or a derivative thereof, or a $C_{1-5}$ alkyl group; X represents a single bond, a $C_{1-5}$ alkylene group, or a substituted $C_{1-5}$ alkylene group; and Y represents a hydrogen atom, a $C_{1-5}$ alkyl group, or a $C_{1-5}$ alkyl group that contains at least one hydroxy group.

7. The separator for a non-aqueous secondary battery according to claim 6, wherein a content amount of the monomer represented by the formula (1) in the resin A is 0.1 mol % or higher.

8. A non-aqueous secondary battery that obtains electromotive force by lithium doping and dedoping, the non-aqueous secondary battery comprising:
   a positive electrode;
   a negative electrode; and
   the separator for a non-aqueous secondary battery according to claim 1, the separator being disposed between the positive electrode and the negative electrode.

9. A separator for a non-aqueous secondary battery, the separator comprising:
   a porous substrate; and
   an adhesive porous layer that is provided on one side or both sides of the porous substrate and contains the following resin A and resin B2, wherein a total acid value of the resin A and the resin B2 is from 3.0 mg KOH/g to 20 mg KOH/g, and wherein a molecular weight distribution (Mw/Mn), which is a ratio of a weight-average molecular weight (Mw) to a number-average molecular weight (Mn), of an entirety of the resin A and the resin B2 is more than 2.0:
   (1) resin A: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from 1.8 mol % to 3.5 mol %, and
   (2) resin B2: a polyvinylidene fluoride type resin that is a copolymer containing, as monomer components, vinylidene fluoride and hexafluoropropylene, wherein a molar content of a hexafluoropropylene monomer unit with respect to a total molar quantity of a vinylidene fluoride monomer unit and the hexafluoropropylene monomer unit is from more than 3.5 mol % to 4.0 mol %.

* * * * *